(12) United States Patent
Huang et al.

(10) Patent No.: US 8,872,476 B2
(45) Date of Patent: Oct. 28, 2014

(54) CHARGING MANAGEMENT SYSTEM AND CHARGER WITH THE SAME

(75) Inventors: Jen-Chin Huang, New Taipei (TW); Zhijian Liu, Changshu (CN)

(73) Assignees: Suzhou Golden Crown New Energy Co., Ltd, Suzhou (CN); Golden Crown New Energy (HK) Limited, Kowloon (HK)

( * ) Notice: Subject to any disclaimer, the term of this patent is extended or adjusted under 35 U.S.C. 154(b) by 243 days.

(21) Appl. No.: 13/362,853

(22) Filed: Jan. 31, 2012

(65) Prior Publication Data

US 2013/0141034 A1 Jun. 6, 2013

(30) Foreign Application Priority Data

Dec. 2, 2011 (CN) .......................... 2011 1 0395159

(51) Int. Cl.
*H02J 7/00* (2006.01)
(52) U.S. Cl.
USPC ............................ 320/116; 320/118; 320/122
(58) Field of Classification Search
CPC .................................................. H02J 7/0014
USPC ........................................................ 320/116
See application file for complete search history.

(56) References Cited

U.S. PATENT DOCUMENTS 7,825,628 B2 * 11/2010 Kuroda ......................... 320/116

FOREIGN PATENT DOCUMENTS

CN 101599651 12/2009
JP 2009290931 * 12/2009 ............... H02J 7/10

* cited by examiner

*Primary Examiner* — Edward Tso
*Assistant Examiner* — Ahmed Omar
(74) *Attorney, Agent, or Firm* — Novak Druce Connolly Bove + Quigg LLP

(57) ABSTRACT

The present invention discloses a charging management system and a charger with such charging management system. The charging management system includes a first signal-output port, a second signal-output port, a third signal-output port and a controller electrically connected with the first, second and third signal-output ports. The first and second signal-output ports are adapted for outputting first and second control signals representing first and second charging currents, respectively, to a charging circuit. The third signal-output port is adapted for outputting a third control signal representing a variable third charging current to the charging circuit. The controller controls the charging management system to operate under at least one of two modes. In the first mode, the controller alternately controls the first and second signal-output ports to output the first and second control signals. In the second mode, the controller only controls the third signal-output port to output the third control signal.

19 Claims, 6 Drawing Sheets

CHARGING MANAGEMENT SYSTEM AND CHARGER WITH THE SAME

CROSS-REFERENCE TO RELATED APPLICATION

This application claims priority to and the benefit of, pursuant to 35 U.S.C. §119(a), Chinese patent application No. 201110395159.4, filed Dec. 2, 2011, entitled "CHARGING MANAGEMENT SYSTEM AND CHARGER WITH THE SAME", by Jen-Chin Huang and Zhijian Liu, the content of which is incorporated herein by reference in its entirety.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference were individually incorporated by reference.

FIELD OF THE INVENTION

The present invention generally relates to the field of battery, and more particularly to a charging management system for charging battery and a charger with the same.

BACKGROUND OF THE INVENTION

Battery management systems (BMS) usually take charge of calculating voltage levels of individual cells in a battery to protect the battery from being overcharged or over-discharged, and monitoring signal transmission inside/outside of the battery. In existing technologies, nearly all of battery-driving products need the battery management systems.

Since it is difficult to assure all the batteries to have absolute equalities during battery manufacturing, some problems may occur when such batteries are electrically connected in series to form a battery pack. For example, during charging of a battery module, even if some battery units in the battery module are still not saturated, some other battery units may have been overcharged. During discharging of the battery module, when some battery units still have power, some other battery units may have been over-discharged. In addition, if the battery units get overcharged or over-discharged for a long time, battery constructing materials may be degraded. As a result, the difference between characteristics of the battery units will be amplified by such degradation.

In order to solve the above problems, in existing technologies, battery management systems are used to balance power of the battery units. Conventionally, there are two types of power balancing methods: one is called passive power balance and the other is called active power balance. In the passive power balance method, redundant power of the battery units is transformed to heat by resistances and then dissipated. However, such passive power balance method can only be realized during charging. The active power balance method adopts a power transition manner, in which redundant power of the battery modules is transmitted to corresponding battery units with less power. Such active power balance method can be realized either in charging or discharging to meet broader needs.

However, the conventional battery management systems with the active power balance method employ DC/DC converters to convert the voltage of all the battery units of the battery pack so as to charge the given battery units needed to be charged. However, such process needs long balance time. In addition, the conventional active power balance method requires many judging and starting steps so that efficiency thereof is low as well.

Most battery management systems of general electric bicycles and general electric motorcycles adopt the passive power balance method to balance among the batteries or the battery modules due to cost consideration. Further, periodically collecting parameters of each battery, including voltage, current, and temperature, etc., is desired.

Generally, a charger can charge the battery under two charging modes, one is called normal charge mode and the other is called variable charge mode. In the normal charge mode, high charging current is adopted at the beginning stage so as to quickly charge the battery, and when the battery is charged near saturation, the charging current is reduced so as to slowly charge the battery. However, in the normal charge mode, two charging ports are usually needed for switching between the stages. In the variable charge mode, only one single charging port is needed for charging the battery with a variable current.

However, in the battery management systems with the passive power balance method, there is no communication between the battery management systems and the exterior chargers, so the battery management systems can only be set to one charging mode, which is not compatible to the chargers under the other charging mode.

In addition, with different technological focus of the chargers and the battery management systems, generic battery suppliers do not manufacture the chargers themselves. Thus, it is difficult for the charger suppliers to neatly meet different charging functions of the battery management systems.

Therefore, a heretofore unaddressed need exists in the art to address the aforementioned deficiencies and inadequacies.

SUMMARY OF THE INVENTION

The present invention provides a charging management system for receiving a signal from a battery to be charged, and controlling a charging circuit of a charger so as to charge the battery to be charged according to the received signal. The charging management system includes a first signal-output port for outputting a first control signal representing a first charging current to the charging circuit, a second signal-output port for outputting a second control signal representing a second charging current to the charging circuit, a third signal-output port for outputting a third control signal representing a variable third charging current to the charging circuit, and a controller electrically connected with the first, second and third signal-output ports. The controller controls the charging management system to operate under at least one of a first mode and a second mode. In the first mode, the controller selectively controls the outputs of the first signal-output port and the second signal-output port. In the second mode, the controller only controls the output of the third signal-output port. In addition, a charger with the above-described charging management system is also disclosed.

In one aspect, the present invention relates to a charging management system for receiving a signal from a battery to be charged, and controlling a charging circuit of a charger so as to charge the battery to be charged according to the received signal. The charging management system in one embodiment includes a first signal-output port adapted for outputting a first control signal representing a first charging current to the charging circuit, a second signal-output port adapted for outputting a second control signal representing a second charging current to the charging circuit, a third signal-output port adapted for outputting a third control signal representing a variable third charging current to the charging circuit, and a controller electrically connected with the first, second and third signal-output ports. The controller controls the charging management system to operate in at least one of a first mode and a second mode. In the first mode, the controller alternately controls the outputs of the first signal-output port and the second signal-output port. In the second mode, the controller only controls the output of the third signal-output port.

In one embodiment, when operating in the first mode, the controller controls the first signal-output port to output the first control signal, and then controls the second signal-output port to output the second control signal. Further, when the battery to be charged is saturated, the controller controls the first and second signal-output ports not to output any control signal.

In one embodiment, the charging management system further includes a first switch electrically connected between the controller and the first signal-output port, and a second switch electrically connected between the controller and the second signal-output port. Through controlling ON/OFF status of the first or second switch, the controller controls the first and second signal-output ports to output or not to output the first and second control signals. In a further embodiment, each of the first switch and the second switch includes an optical coupling relay.

In one embodiment, when operating in the first mode, the second charging current is far lower than the first charging current so that the first charging current is adapted to quickly charge the battery to be charged in a quick-charge mode, and the second charging current is adapted to slowly charge the battery to be charged in a trickle-charge mode when the battery to be charged is charged near saturation.

In one embodiment, when operating in the second mode, the controller controls the third signal-output port by outputting a Pulse Width Modulation (PWM) signal to the third signal-output port. In a further embodiment, the charging management system further includes an amplifier electrically connected between the controller and the third signal-output port to amplify the PWM signal.

In one embodiment, the charging management system further includes a signal-input port for receiving communication signal from the battery to be charged, where the controller is adapted for receiving an input signal of the signal-input port and controlling the first, second and third signal-output ports according to the input signal.

In one embodiment, the charging management system further comprises a power port adapted for receiving electric power from the battery to be charged, and a voltage conversion circuit electrically connected between the power port and the controller. The power port includes a positive pole and a negative pole, and each of the positive pole and the negative pole includes two conductive contacts.

In one embodiment, when operating in the second mode, when charging of the battery to be charged begins, the third charging current is high for quick charging, and when the battery to be charged is charged near saturation, the third charging current is gradually reduced until the battery to be charged is saturated.

In another aspect, the present invention relates to a charger. The charger in one embodiment includes a charging management system and a charging circuit. The charging management system includes a first signal-output port for outputting a first control signal representing a first charging current, a second signal-output port for outputting a second control signal representing a second charging current, a third signal-output port for outputting a third control signal representing a variable third charging current, and a controller electrically connected with the first, second and third signal-output ports to control the charging management system to operate under at least one of first and second modes. In the first mode, the controller alternately controls the first signal-output port to output the first control signal and the second signal-output port to output the second control signal as a control signal. In the second mode, the controller only controls the third signal-output port to output the third control signal as the control signal. The charging circuit is adapted for receiving the control signal outputted from the charging management system and outputting the corresponding first, second or third charging current to charge the battery to be charged according to the control signal.

In one embodiment, when operating in the first mode, the controller controls the first signal-output port to output the first control signal as the control signal, and then the controller controls the second signal-output port to output the second control signal as the control signal.

In one embodiment, when the battery to be charged is saturated, the controller controls the first and second signal-output ports not to output any control signal.

In one embodiment, the charging management system includes a first switch electrically connected between the controller and the first signal-output port, and a second switch electrically connected between the controller and the second signal-output port. Through controlling the ON/OFF status of the first or the second switches, the controller controls the first signal-output port and the second signal-output port to output or not to output the first and second control signals.

In one embodiment, when operating in the first mode, the second charging current is far lower than the first charging current so that the first charging current is adapted to quickly charge the battery to be charged in a quick-charge mode, and the second charging current is adapted to slowly charge the battery to be charged in a trickle-charge mode when the battery to be charged is charged near saturation.

In one embodiment, when operating in the second mode, when charging of the battery to be charged begins, the third charging current is high for quick charging, and when the battery to be charged is charged near saturation, the third charging current is gradually reduced until the battery to be charged is saturated.

In one embodiment, when operating in the second mode, the controller controls the third signal-output port by outputting a Pulse Width Modulation (PWM) signal to the third signal-output port. Further, the charging management system further includes an amplifier electrically connected between the controller and the third signal-output port to amplify the PWM signal.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
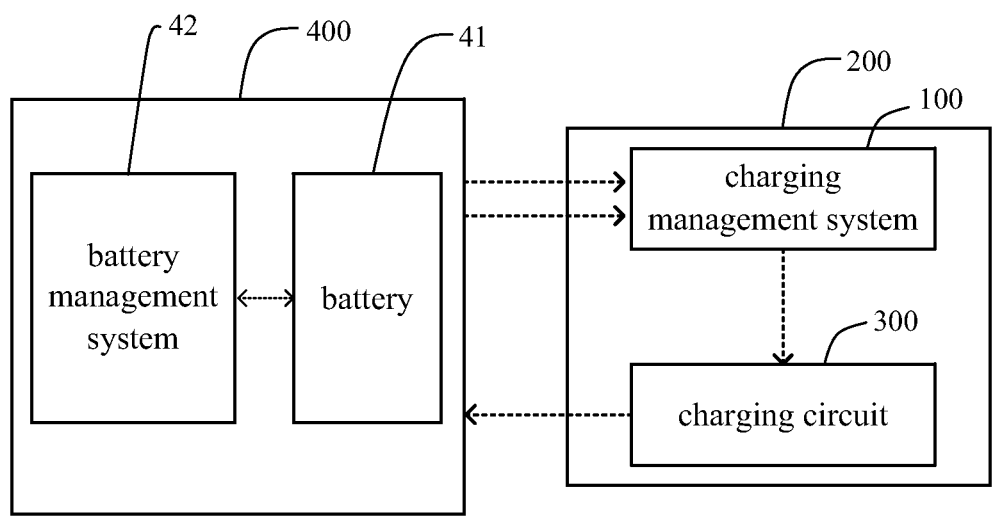
FIG. 1 is a schematic diagram of a charging management system showing relationships between a charging circuit and a battery management system in accordance with a first embodiment of the present invention; and FIG. 2A~
Figure 2A:
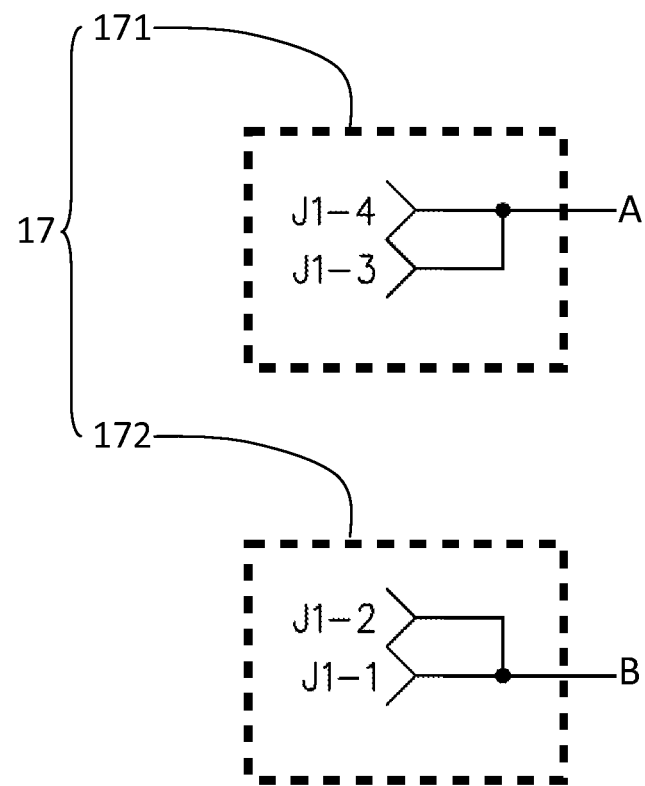
FIG. 2E is schematic diagram of the charging management system in accordance with an illustrated embodiment of the present invention.
Figure 2B:
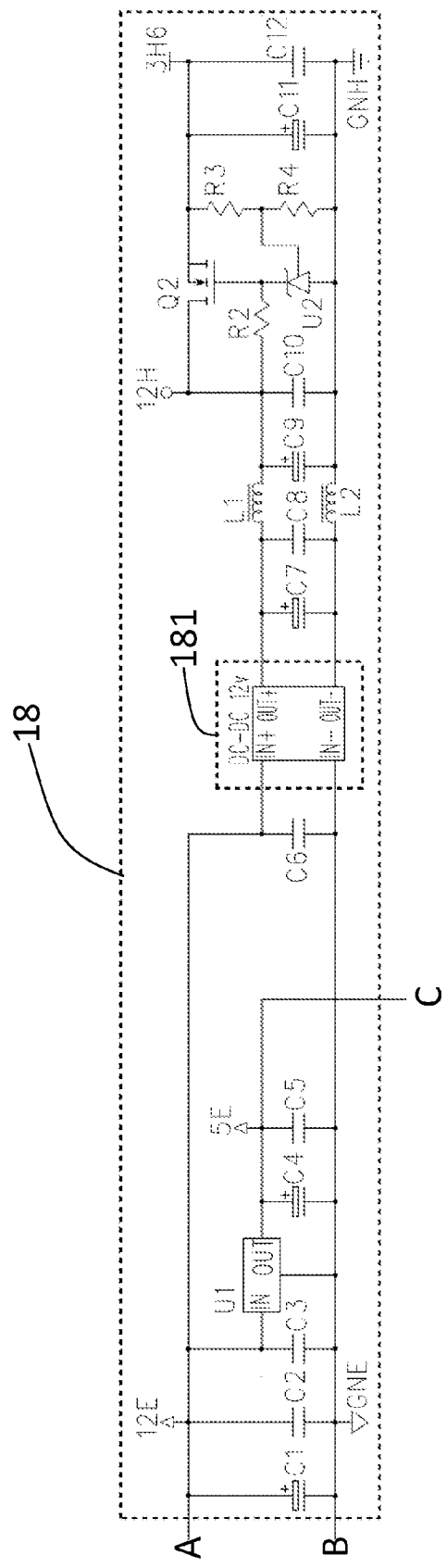
Figure 2C:
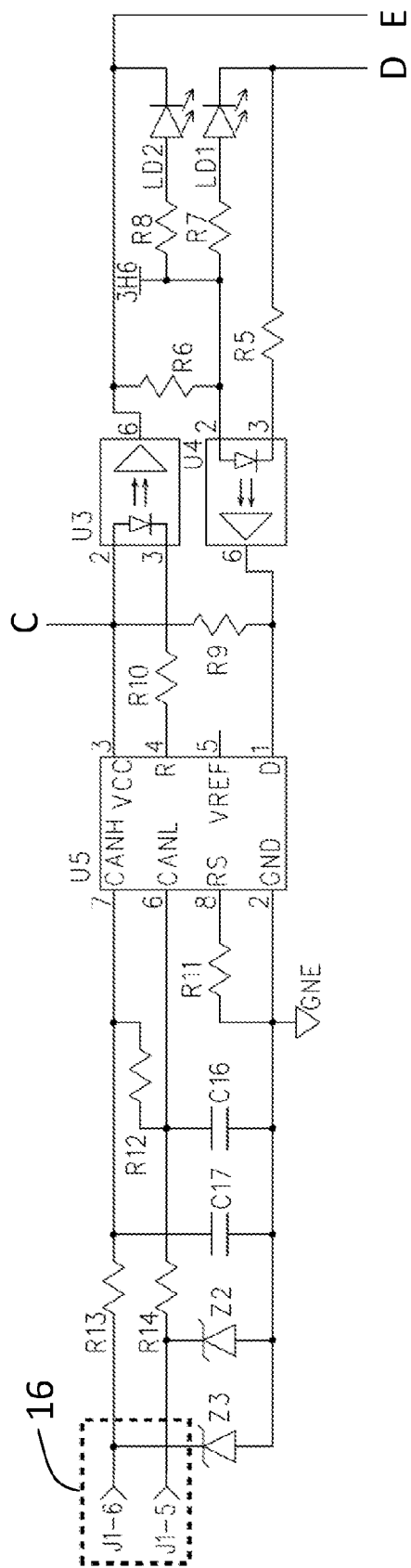
Figure 2D:
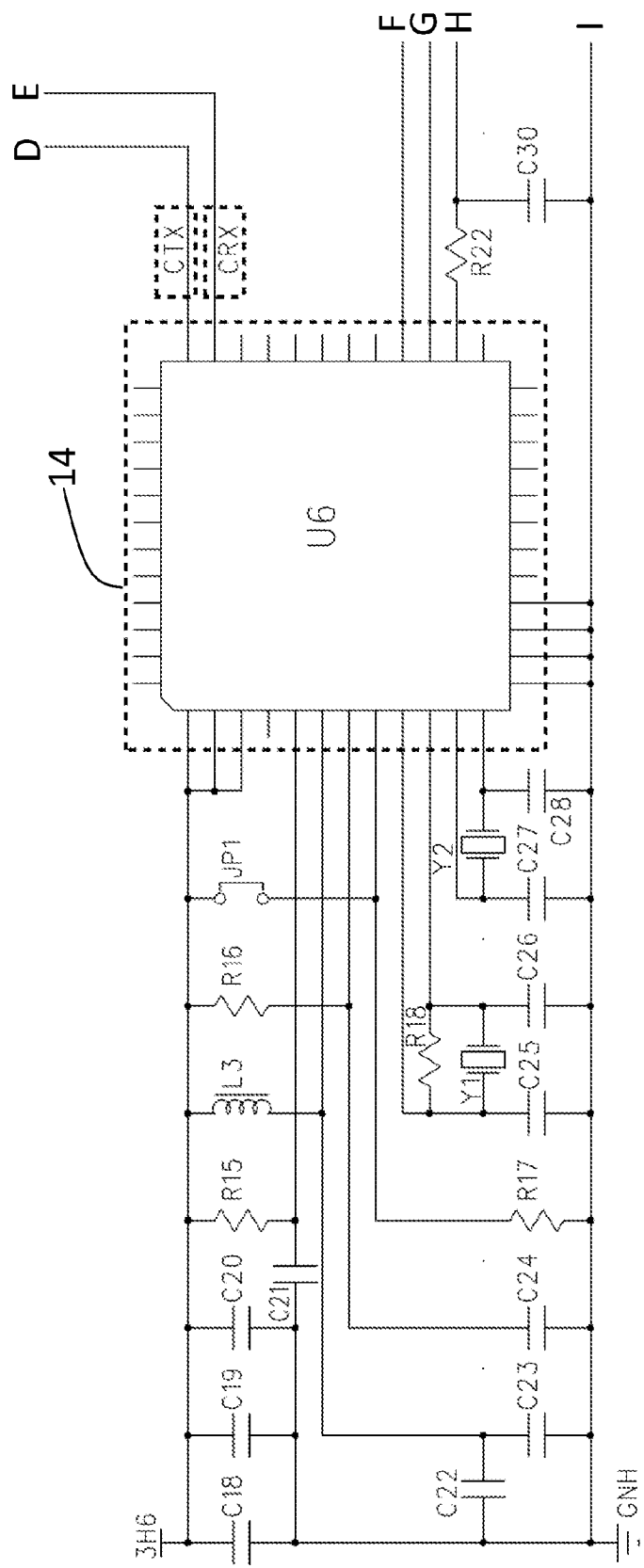
Figure 2E:
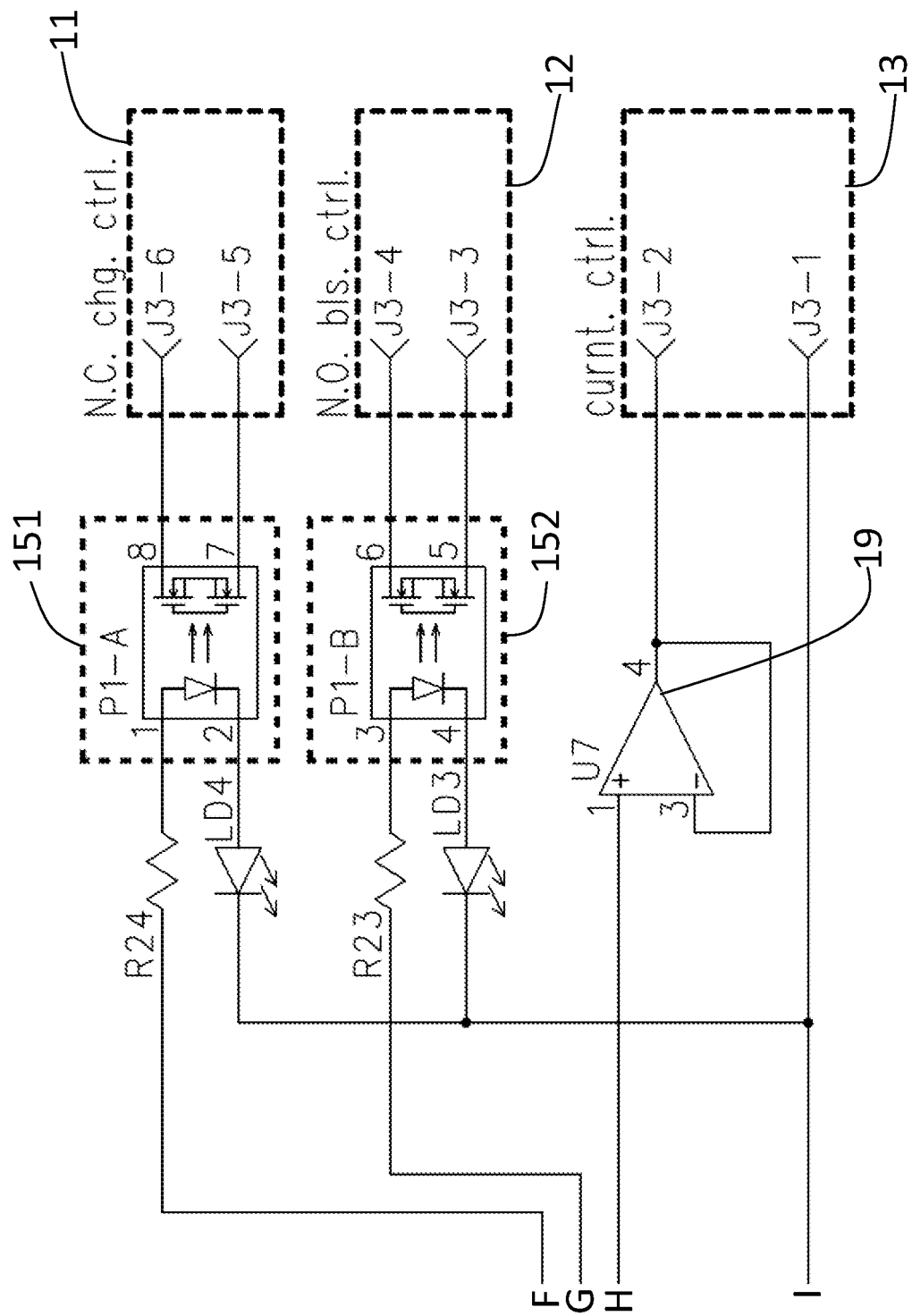

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, layer or section. Thus, a first element, component, region, part or section discussed below could be termed a second element, component, region, layer or section without departing from the teachings of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

The description will be made as to the embodiments of the present invention in conjunction with the accompanying drawings in FIG. 1 and FIGS. 2A~2E. Reference will be made to the accompanying drawings to describe the present invention In detail, wherein depicted elements are not necessarily shown to scale and wherein like or similar elements are designated by same or similar reference numeral through the several views and same or similar terminology. In accordance with the purposes of this invention, as embodied and broadly described herein, this invention, in one aspect, relates to a charging management system for charging battery, and a charger with such a charging management system.

Referring to FIG. 1, a battery system 400 is schematically shown according to one embodiment of the present invention. In the illustrated embodiment, the battery system 400 includes a battery management system 42 and a battery 41 that includes multiple battery units electrically connected to each other in series. According to the present invention, the battery system 400 or the battery 41 is the battery that needs to be charged. In some embodiments, the multiple battery units can be grouped, either in the same number or in different numbers, to form multiple battery modules.

Referring to FIG. 1 and FIGS. 2A~2E, in accordance with the illustrated embodiment of the present invention, a charger 200 has a charging management system adapted for receiving a signal from the battery system 400, and a charging circuit 300 adapted for charging the battery to be charged according to the received signal, under the control of the charging management system.

The charging management system includes a first signal-output port 11, a second signal-output port 12, a third signal-output port 13 and a controller 14.

The first signal-output port 11, the second signal-output port 12 and the third signal-output port 13 are all adapted for outputting charge-current control signals, which represent certain current values, to the charging circuit 300, so that the charging circuit 300 is capable of selecting different charging currents for charging the battery 41 of the battery system 400. The differences among them are that the first signal-output port 11 is adapted for outputting a first control signal which represents a first charging current to the charging circuit 300, the second signal-output port 12 is adapted for outputting a second control signal which represents a second charging current lower than the first charging current to the charging circuit 300, and the third signal-output port 13 is adapted for outputting a third control signal which represents a variable third charging current to the charging circuit 300.

In one embodiment, the current value of the second charging current is far lower than the first charging current so that the first charging current is adapted to quickly charge the battery 41 in a quick-charge mode, because a higher charging current easily realizes better charging rate so as to improve charging efficiency. The second charging current is adapted to slowly charge the battery 41 in a trickle-charge mode when the battery 41 is charged to be near the saturation.

The third charging current is variable according to the state of the battery to be charged. For example, when charging of the battery 41 begins, the third charging current is high for quick charging, and when a part of the battery units of the battery 41 is near saturation, the third charging current is gradually reduced, and as more battery units of the battery 41 are saturated, the third charging current is further reduced. The third charging current is gradually reduced until the battery 41 is saturated. The reason for this arrangement is that, during the charging process, the voltage Vcell of the battery 41 detected by the battery management system 42 of the battery system 400 essentially includes the voltage Vcap of the battery core and the voltage difference Vres generated by the internal resistance of the battery core. The voltage Vcell equals to the sum of the voltage Vcap and the voltage difference Vres. Further, high charging current would increase the voltage difference Vres resulted from the internal resistance of the battery core.

In a detailed embodiment, for example, if a charging current of about 100 A is applied to charge the battery 41, the detected voltage of the battery 41 is about 3.8V. If the charging current is reduced to about 2 A at this time, the corresponding detected voltage of the battery 41 becomes about 3.5V. It should be noted that, with a high charging current, the detected voltage of the battery 41 would become less accurate to reflect the actual charging state of the battery 41. For this reason, the influence in detecting the voltage of the battery 41 can be reduced by gradually reducing the third charging current as far as possible, thereby ensuring reliability of the battery charging and improving charging efficiency.

As shown in FIGS. 2A~2E, the controller 14 is electrically connected with the first, second and third signal-output ports 11, 12 and 13, and controls the charging management system to operate at least in one of a first mode and a second mode. The first mode and the second mode respectively correspond to two existing charging modes of the chargers 200. However, in some embodiments, more modes can be provided to correspond to more types of the chargers 200.

The controller 14 includes a Micro Controller Unit (MCU) having a Central Processing Unit (CPU), a Read-Only Memory (ROM) and a Random Access Memory (RAM), a timing module, an A/D converter, and multiple input/output ports. Alternatively, the controller 14 can also use other types of integrated circuits, such as Application Specific Integrated Circuit (ASIC) and Field Programmable Gate Array (FPGA), and so on.

If the controller 14 only identifies digital switch signals, the controller 14 corresponds to the first mode. In this case, the controller 14 selectively controls the first signal-output port 11 to output the first control signal and the second signal-output port 12 to output the second control signal as a control signal. In detail, when charging of the battery 41 begins, the controller 14 controls the first signal-output port 11 to output the first control signal so that the charger 200 is adapted to quickly charge the battery 41 under the higher first charging current. When the battery management system 42 detects that the battery 41 is near saturation, the communication signal of the battery to be charged is transmitted to the charging management system via a signal-input port 16. Thereafter, the controller 14 controls the second signal-output port 12 to output the second control signal so that the charger 200 is adapted to slowly charge the battery 41, according to the acquired communication signal representing the charging status of the battery 41.

In an alternative embodiment, in the first mode, when the battery management system 42 detects that the battery 41 is saturated, the controller 14 controls the first signal-output port 11 and the second signal-output port 12 so that neither outputs any charge-current control signal. In other words, the charging circuit 300 stops charging the battery 41 when the battery 41 gets saturated.

In the exemplary embodiment shown in FIGS. 2A~2E, the charging management system further includes a first switch 151 electrically connected between the controller 14 and the first signal-output port 11, and a second switch 152 electrically connected between the controller 14 and the second signal-output port 12. Through controlling ON/OFF status of the first or second switches 151 or 152, the controller 14 controls the first signal-output port 11 and the second signal-output port 12 to output or not to output the first and second control signals, respectively.

The first and second switches 151 and 152 include triodes, Silicon Controlled Rectifiers (SCRs), relay switches, Metallic Oxide Semiconductor Field Effect Transistors (MOSFETs), or the like. In the embodiment, the first and second switches 151 and 152 include first and second optical coupling relays P1-A and P1-B, respectively. Through controlling the ON/OFF status of the MOSFET set in the first or second optical coupling relays P1-A or P1-B, the first or second switches 151 or 152 can be therefore controlled to achieve the ON/OFF purpose accordingly.

If the controller 14 is capable of identifying analog control signals, the controller 14 corresponds to the second mode. In this case, the controller 14 only controls the third signal-output port 13 to output the third control signal. Specifically, the controller 14 controls the third signal-output port 13 by outputting a PWM signal into the third signal-output port 13. Further, the PWM signal can be amplified by an amplifier 19 which is electrically connected between the controller 14 and the third signal-output port 13, in order to keep charging-control accurateness.

When charging of the battery 41 begins, the controller 14 controls the third signal-output port 13 to output the third control signal so as to quickly charge the battery 41 under a high current. When the battery management system 42 detects that the battery 41 or at least a part of the battery units of the battery 41 reach saturation, a communication signal generated by the battery 41 is transmitted to the charging management system via the corresponding signal-input port. Thereafter, the controller 14 controls the third signal-output port 13 to output a reduced third charging current according to the communication signal. The third charging current is slightly lower than the former current so that the voltage difference Vres generated by the internal resistance of the battery core is reduced because of the reduced third charging current. As a result, the battery units not saturated can be further charged. Thereafter, the third charging current is gradually reduced until the voltage of the battery 41 is not reduced along with the reduction of the third charging current, or until the reduced voltage resulted from the reduction of the third charging current is lower than a certain voltage threshold.

In the embodiment shown in FIGS. 2A~2E, the charging management system further includes a power port 17 and a voltage conversion circuit 18. The power port 17 is adapted for receiving electric power from the battery system 400. The voltage conversion circuit 18 is electrically connected between the power port 17 and the controller 14. In this arrangement, the electric power required for operation of the whole charging management system including the controller 14 is provided by the battery system 400. The voltage conversion circuit 18 is adapted for reducing and stabilizing large output current outputted by the battery 41 to lower working current for the charging management system, via a DC/DC converter 181 and a voltage-stabilizing circuit of the voltage conversion circuit 18. The advantage of this arrangement is that controller suppliers do not need to design additional power-supply circuits, thereby reducing design and manufacture costs accordingly.

In one embodiment, the power port 17 includes a positive pole 171 having two conductive contacts J1-3 and J1-4, and a negative pole 172 having two conductive contacts J1-1 and J1-2. The functions of the two conductive contacts J1-3 and J1-4 of the positive pole 171 are the same, and the functions of the two conductive contacts of the negative pole 172 J1-1 and J1-2 are the same as well. As a result, even if one of the conductive contacts J1-3 and J1-4 or one of the conductive contacts J1-1 and J1-2 is broken, the charging management system can still operate so as to prevent the battery management system 42 from being damaged.

Although the battery management system 42 adopts the passive power-consumption balance method as described in detail in the above-described embodiments, in some other embodiments, the battery management system 42 can also adopt the active power-consumption balance method to achieve the same function of the present invention.

In one embodiment of the present invention regarding the charger 200, the above-described charging management system is adopted thereto, and the charging management system is electrically connected with the charging circuit 300. As a result, the charging circuit 300 receives the control signal from the charging management system and then outputs the corresponding charging current provided for charging the battery system 400.

In sum, the charging management system of the present invention is capable of alternately operating in at least two different modes. For a charger 200 that only identifies the digital switch signals, the charging management system adopts the first mode. In the first mode, through control of the first control signal representing the first charging current and the second control signal representing the second charging current, different charging functions including quick charging, trickle charging and stop charging can be achieved. For a charger 200 that identifies the analog control signals, the charging management system adopts the second mode. In the second mode, through control of the third control signal which represents the variable third charging current, the charger 200 can realize flexible charging of the battery 41 in a current-variable charging way. In this case, even if the chargers 200 have different operation modes, all of them can be adapted for effectually charging the battery system 400 having the battery management system 42, and there is no need of adjusting the battery management system 42 of the battery system 400.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

It is to be understood, however, that even though numerous, characteristics and advantages of the present invention have been set forth in the foregoing description, together with details of the structure and function of the invention, the disclosed is illustrative only, and changes may be made in detail, especially in matters of number, shape, size, and arrangement of parts within the principles of the invention to the full extent indicated by the broadest general meaning of the terms in which the appended claims are expressed.

What is claimed is:

1. A charging management system for receiving a signal from a battery to be charged, and controlling a charging circuit of a charger so as to charge the battery according to the received signal, the charging management system comprising:
  - a first signal-output port adapted for outputting a first control signal representing a first charging current to the charging circuit;
  - a second signal-output port adapted for outputting a second control signal representing a second charging current to the charging circuit;
  - a third signal-output port adapted for outputting a third control signal representing a variable third charging current to the charging circuit; and
  - a controller electrically connected with the first, second and third signal-output ports so as to control the charging management system to operate in at least one of a first mode and a second mode, wherein
    (i) in the first mode, the controller selectively controls outputs of the first signal-output port and the second signal-output port; and
    (ii) in the second mode, the controller only controls an output of the third signal-output port.

2. The charging management system as claimed in claim 1, wherein in the first mode, the controller controls the first signal-output port to output the first control signal, and subsequently, controls the second signal-output port to output the second control signal.

3. The charging management system as claimed in claim 2, wherein in the first mode, the second charging current is far lower than the first charging current so that the first charging current is configured to quickly charge the battery in a quick-charge mode, and the second charging current is configured to slowly charge the battery in a trickle-charge mode when the battery is charged near saturation.

4. The charging management system as claimed in claim 2, wherein when the battery to be charged is saturated, the controller controls the first and second signal-output ports not to output any control signal.

5. The charging management system as claimed in claim 1, further comprising a first switch electrically connected between the controller and the first signal-output port, and a second switch electrically connected between the controller and the second signal-output port, through controlling the ON/OFF status of the first or second switch, wherein the controller controls the first and second signal-output ports to output or not to output the first and second control signals, respectively.

6. The charging management system as claimed in claim 5, wherein each of the first switch and the second switch comprises an optical coupling relay.

7. The charging management system as claimed in claim 1, wherein in the second mode, the controller controls the third signal-output port by outputting a Pulse Width Modulation (PWM) signal to the third signal-output port.

8. The charging management system as claimed in claim 7, wherein in the second mode, when charging of the battery begins, the third charging current is high for quick charging, and when the battery is charged near saturation, the third charging current is gradually reduced until the battery is saturated.

9. The charging management system as claimed in claim 7, further comprising an amplifier electrically connected between the controller and the third signal-output port to amplify the PWM signal.

10. The charging management system as claimed in claim 1, further comprising a signal-input port for receiving a communication signal from the battery to be charged, wherein the controller is configured to receive an input signal of the signal-input port and control the first, second and third signal-output ports according to the input signal.

11. The charging management system as claimed in claim 1, further comprising a power port adapted for receiving electric power from the battery to be charged, and a voltage conversion circuit electrically connected between the power port and the controller.

12. The charging management system as claimed in claim 11, wherein the power port comprises a positive pole and a negative pole, each of the positive pole and the negative pole comprising two conductive contacts.

13. A charger for charging a battery, comprising:
a charging management system, comprising:
a first signal-output port adapted for outputting a first control signal representing a first charging current;
a second signal-output port adapted for outputting a second control signal representing a second charging current;
a third signal-output port adapted for outputting a third control signal representing a variable third charging current; and
a controller electrically connected with the first, second and third signal-output ports to control the charging management system to operate under at least one of first and second modes, wherein (i) in the first mode, the controller selectively controls outputs of the first signal-output port and the second signal-output port; and
(ii) in the second mode, the controller only controls an output of the third signal-output port,
wherein the outputs of the first, second and third signal-output ports are used as a control signal; and
a charging circuit for receiving the control signal and outputting the corresponding first, second or third charging current to charge the battery according to the control signal.

14. The charger as claimed in claim 13, wherein in the first mode, the controller controls the first signal-output port to output the first control signal, and subsequently, controls the second signal-output port to output the second control signal.

15. The charger as claimed in claim 14, wherein in the first mode, the second charging current is far lower than the first charging current so that the first charging current is adapted to quickly charge the battery in a quick-charge mode, and the second charging current is adapted to slowly charge the battery in a trickle-charge mode when the battery to be charged is charged near saturation.

16. The charger as claimed in claim 14, wherein when the battery to be charged is saturated, the controller controls the first and second signal-output ports not to output any control signal.

17. The charger as claimed in claim 13, wherein the charging management system further comprises a first switch electrically connected between the controller and the first signal-output port, and a second switch electrically connected between the controller and the second signal-output port, and through controlling the ON/OFF status of the first or second switch, wherein the controller controls the first and second signal-output ports to output or not to output the first and second control signals, respectively.

18. The charger as claimed in claim 13, wherein in the second mode, when charging of the battery begins, the third charging current is high for quick charging, and when the battery is charged near saturation, the third charging current is gradually reduced until the battery is saturated.

19. The charger as claimed in claim 13, wherein in the second mode, the controller controls the third signal-output port by outputting a Pulse Width Modulation (PWM) signal to the third signal-output port, and wherein the charging management system further comprises an amplifier electrically connected between the controller and the third signal-output port to amplify the PWM signal.

* * * * *